(12) United States Patent
Denton et al.

(10) Patent No.: US 6,567,413 B1
(45) Date of Patent: May 20, 2003

(54) OPTICAL NETWORKING MODULE INCLUDING PROTOCOL PROCESSING AND UNIFIED SOFTWARE CONTROL

(75) Inventors: I. Claude Denton, Beaverton, OR (US); Bruce Murdock, Beaverton, OR (US); James L. Gimlett, Tigard, OR (US); Edward L. Hershberg, Portland, OR (US); Scott W. Lowrey, Portland, OR (US); Richard A. Booman, Lake Oswego, OR (US); Alfred C. She, Beaverton, OR (US)

(73) Assignee: Network Elements, Inc., Beaverton, OR (US)

( * ) Notice: Subject to any disclaimer, the term of this patent is extended or adjusted under 35 U.S.C. 154(b) by 7 days.

(21) Appl. No.: 09/861,002

(22) Filed: May 18, 2001

(51) Int. Cl.[7] .............................. H04L 12/28; H04J 3/16
(52) U.S. Cl. ....................................... 370/401; 370/465
(58) Field of Search ................................ 370/400–408, 370/465–474; 359/118, 135

(56) References Cited

U.S. PATENT DOCUMENTS 6,075,788 A * 6/2000 Vogel ......................... 370/466
6,359,859 B1 * 3/2002 Brolin et al. ................ 370/401
6,414,966 B1 * 7/2002 Kulkarni et al. ............ 370/465
2002/0089715 A1 * 7/2002 Mesh et al. ................. 359/118

* cited by examiner

Primary Examiner—Steven Nguyen
(74) Attorney, Agent, or Firm—Schwabe, Williamson & Wyatt, PC

(57) ABSTRACT

An optical networking module is formed with an integrated module including optical, optical-electrical and protocol processing components, and complementary software. In one embodiment, the integral protocol processing component is a single ASIC and supports multiple protocols. The module is further equipped with support control electronics in support of control functions to manage the optical, optical-electrical as well as the multi-protocol processing component. The integrated module together with the complementary control software present to an optical networking equipment designer/developer a singular component that handles optical to electrical and electrical to optical conversion, as well as data link and physical sub-layer processing for a selected one of a plurality of datacom and telecom protocols, spanning local, regional as well as wide area networks. The integrated module and complementary control software further presents to the optical networking designer/developer a unified software interface for managing the various components and functions.

4 Claims, 4 Drawing Sheets

Static Network Functions 130

- Initialization and Termination ~412
- Protocol Flow ~414
- Configuration ~416
- Module Management ~418

Dynamic Network Function 140

- Physical Layer ~422
- Interrupt Monitoring and Interrupt Handling ~424
- General Operational Monitoring ~426

Figure 4

OPTICAL NETWORKING MODULE INCLUDING PROTOCOL PROCESSING AND UNIFIED SOFTWARE CONTROL

BACKGROUND OF THE INVENTION

1. Field of the Invention

The present invention relates to the field of networking. More specifically, the present invention relates to optical networking module employed in high speed network trafficking equipment, such as 10 gigabit optical-electrical routers or switches.

2. Background Information

With advances in integrated circuit, microprocessor, networking and communication technologies, increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional and wide area networks.

As a result of this trend of increased connectivity, increasing number of applications that are network dependent are being deployed. Examples of these network dependent applications include but are not limited to, the world wide web, email, Internet based telephony, and various types of e-commerce and enterprise applications. The success of many content/service providers as well as commerce sites depend on high speed delivery of a large volume of data across wide areas. In turn, the trend leads to increased demand for high speed data trafficking equipment, such as high speed optical-electrical routers or switches and so forth.

In the early generations of optical-electrical networking trafficking equipment, separate individual optical, optical-electrical and protocol processing components were employed. Moreover, multiple protocol processing components had to be employed, as each component performed data link and physical sub-layer processing for a corresponding protocol. Further, these separate components were typically developed or available from different vendors, with each component having its own approach and interface to configuration and operational management. As a result, an optical network trafficking equipment designer/manufacturer has had to work and deal with the optical, electrical and protocol processing aspects separately, as separate components, and often via very different interfaces. As system complexity and data rates have increased, this engineering challenge has become increasingly difficult to solve, resulting in time-to-market and cost disadvantages.

Recently, some component suppliers, such as Network Elements, Inc, of Beaverton, Oreg., have begun to offer optical network modules that integrate the optical and optical-electrical components. Representatives of these integrated modules are Network Elements' ONM10PHY and ONM10PHYOXC optical networking modules. These integrated modules are designed for high speed optical networking applications in the realm of 10Gb/s DWDM, SONET/SDH, and Ethernet LAN and WAN. These integrated modules perform physical layer functions such as optical-to-electrical and electrical-to-optical conversion, clock and data recovery, transmit clock multiplication, serialization and deserialization functions.

While the availability of these integrated components improve the productivity of high speed network traffic equipment designers, the handling of data link and physical sub-layer processing for different protocols have fundamentally remained the responsibilities of separate ASICs from different vendors. At 10 Gb/s and beyond, the integration of these processing ASICs with optoelectronic and software systems becomes increasingly difficult, even as the continuing growth of the Internet demands faster time to market and higher system flexibility. A need exists to reduce the complexity of designing optical network trafficking equipment.

SUMMARY OF THE INVENTION

An optical networking module is formed with an integrated module including optical, optical-electrical, and protocol processing components, and complementary control software. In one embodiment, the integral protocol processing component is a single ASIC and processes multiple protocols with data rates of at least 10Gb/s. The module is further equipped with support control electronics in support of control functions to manage the optical, optical-electrical as well as the multi-protocol processing component.

The integrated module together with the complementary control software present to an optical networking equipment designer/developer a singular component that handles optical to electrical and electrical to optical conversion, as well as data link and physical sub-layers processing for a selected one of a plurality of datacom and telecom protocols, spanning local, regional as well as wide area networks. The integrated module and complementary control software further present to the optical networking designer/developer a unified software interface for managing the various components and functions.

BRIEF DESCRIPTION OF DRAWINGS

The present invention will be described by way of exemplary embodiments, but not limitations, illustrated in the accompanying drawings in which like references denote similar elements, and in which:

FIG. 4 illustrates the static and dynamic networking functions of FIG. 2 in further details, in accordance with one embodiment.

GLOSSARY

| | |
|---|---|
| 10Gbase-LR | 64/66 coded 1310 nm LAN standard for 10 Gigabit Ethernet |
| 10Gbase-LW | 64/66 coded SONET encapsulated 1310 nm WAN standard for 10 Gigabit Ethernet |
| ASIC | Application Specific Integrated Circuit |
| DWDM | Dense Wavelength Division Multiplexing |
| Egress | Outgoing data path from the system to the network |
| FCS | Frame Check Sequence |
| HDLC | High-Level Data Link Control. A communication protocol used in Packet over SONET switching network. |
| Ingress | Incoming data path from the network to the system |
| IP | Internet Protocol |
| LAN | Local Area Network |
| LVDS | Low voltage differential signal |
| MAC | Media Access Control layer, defined for Ethernet systems |
| OIF | Optical Internetworking Forum |
| POS | Packet over SONET |
| PPP | Point to Point Protocol |
| SDH | Synchronous Digital Hierarchy |
| SONET | Synchronous Optical network, a PHY telecommunication protocol |
| SPI-4 | System Packet Interface Level 4(also POS-PHY 4) |
| SSTL | Stub Series Terminated Logic |
| XGMII | 10Gb Media Independent Interface |
| WAN | Wide Area Network |

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention. Further, the description repeatedly uses the phrase "in one embodiment", which ordinarily does not refer to the same embodiment, although it may.

Overview

Figure 1:
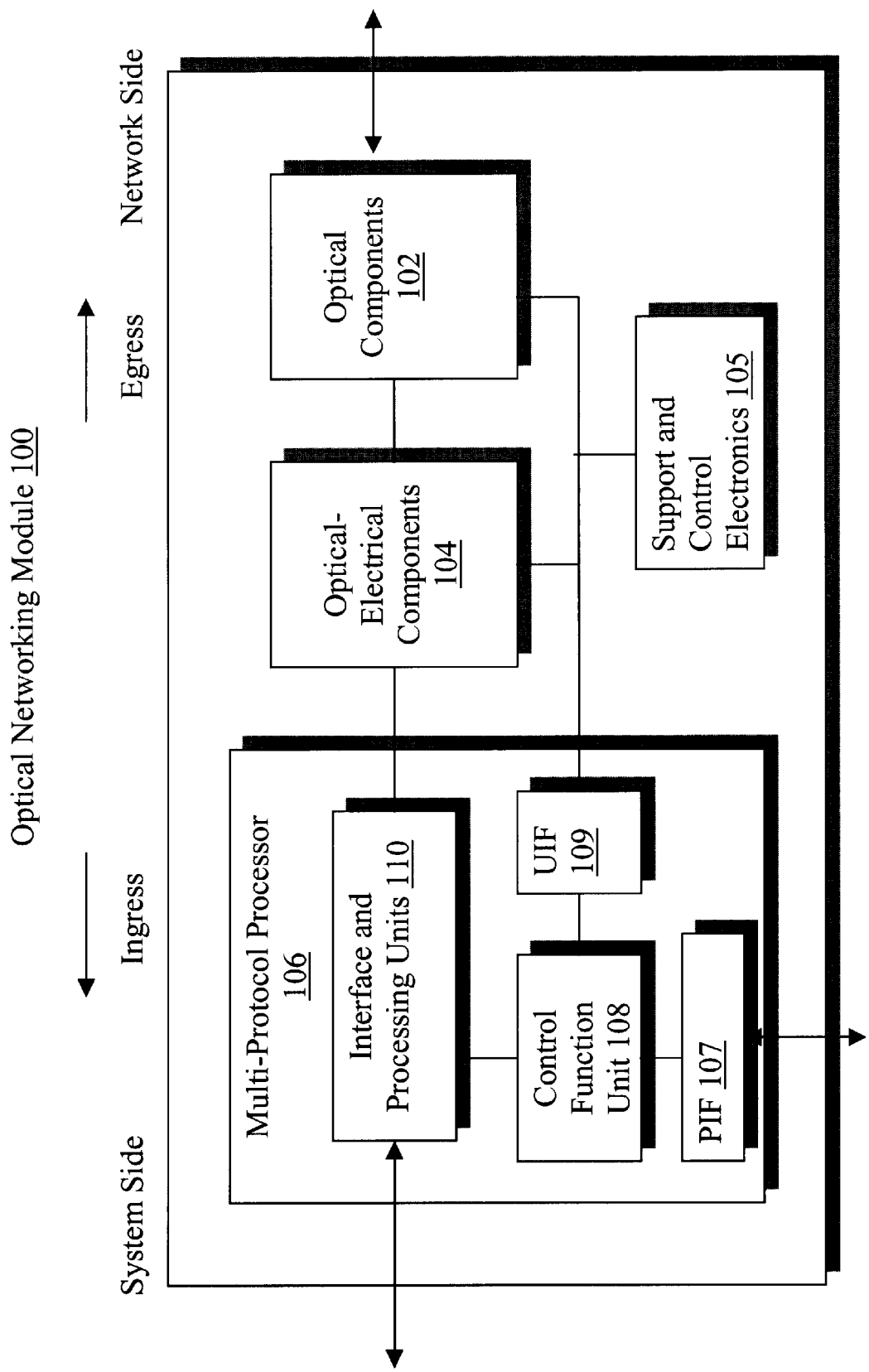
FIG. 1 illustrates an overview of the optical networking module of the present invention, in accordance with one embodiment.

Referring now to FIG. 1, wherein a block diagram illustrating the integrated optical networking module of the present invention, in accordance with one embodiment, is shown. As illustrated, integrated optical networking module 100 of the present invention includes optical components 102, optical-electrical components 104, support control electronics 105, and protocol processor 106, coupled to each other as shown. Protocol processor 106 includes in particular, a number of interfaces and processing units 110, control function unit 108, processor interface 107 and utility interface 109 coupled to each other and components 102-104 as shown. In one embodiment, protocol processor 106 supports multiple datacom and telecom protocols.

Optical components 102 are employed to facilitate the sending and receiving of optical signals encoded with data transmitted in accordance with a selected one of a plurality of protocols known in the art. Optical-electrical components 104 are employed to encode the egress data onto the optical signals, and decode the encoded ingress data. Examples of such protocols include but are not limited to SONET/SDH, 10 Gbase-LR, 10 Gbase-LW, Ethernet on SONET, Packet on SONET, and so forth. Support control electronics 105 are employed to facilitate management of the various aspects of optical components 102 and optical-electrical components 104. Multi-protocol processor 106 is employed to perform data link and physical sub-layer processing on the egress and ingress data in accordance with a selected one of a plurality of supported protocols, and to facilitate management of the multi-protocol processor 106 itself and optical, optical-electrical components 102 and 104 (through support control electronics 105).

In a preferred embodiment, multi-protocol processor 106 is implemented in the form of an ASIC. Optical components 102, optical-electrical components 104, support control electronics 105 and multi-protocol processor ASIC 106 are encased in a body (not shown) forming a singular optical networking module, with provided software forming a singular control interface for all functionality. That is, in addition to being equipped to provide optical to electrical and electrical to optical conversions, clock and data recovery, and so forth, integrated optical networking module 100 is also equipped to provide data link and physical sub-layer processing on egress and ingress data selectively for a number of protocols.

Figure 3:
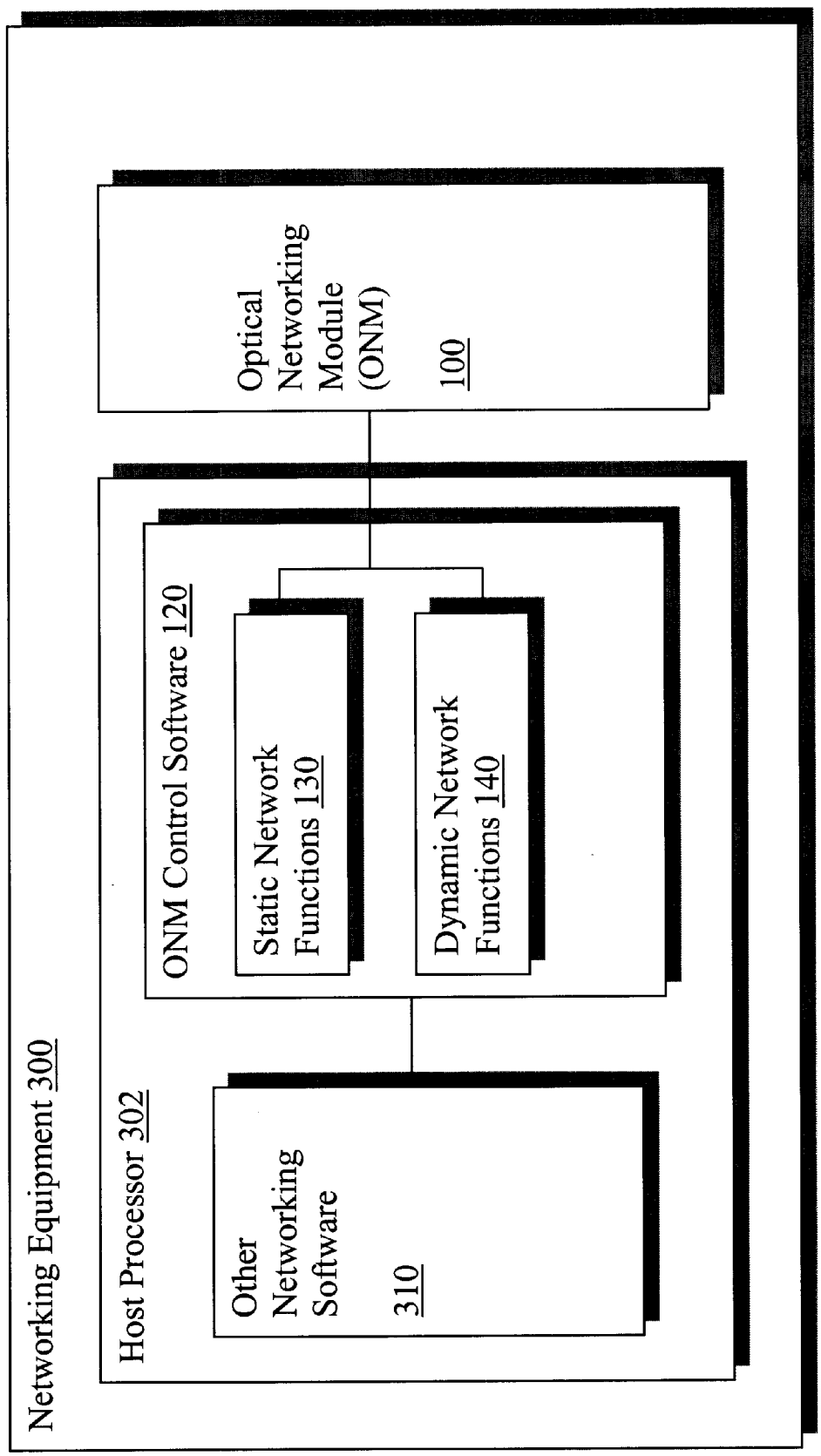
FIG. 3 illustrates an optical networking equipment incorporated with the optical networking module of the present invention.

Further, in the preferred embodiment, control function unit 108 also includes control features, i.e. control registers and the like (not shown), in conjunction with support control electronics 105 to support a number of control functions for managing optical components 102, optical-electrical components 104 as well as multi-process protocol ASIC 106. Processor interface 107 is employed to facilitate provision of control specifications to control function unit 108, whereas utility interface 109 (a digital interface) is employed to facilitate management of components 102 and 104 by control function unit 108 (by way of support control electronics 105). The complementary control functions are placed with an embedded processor of an optical networking equipment employing integrated optical network module 100 of the present invention (FIG. 3 & 4). That is, integrated optical networking module 100 of the present invention (the illustrated embodiment) also advantageously presents a singular unified software interface to optical networking equipment designers and developers to manage configuration and operation of the optical and electrical components, as well as protocol processing. As those skilled in the art would appreciate, as a result of the novel integration and unified presentation of these functions, the complexity of designing optical networking equipment, such as optical-electrical routers, switches, and the like, is reduced.

Before further describing the present invention, it should be noted that while inclusion of control processor 108, processor interface 107 and utility interface 109 with multi-protocol processor ASIC 106 is preferred, the present invention may nevertheless be practiced with some or all of the control function and the associated interfaces disposed away from multi-protocol processor ASIC 106 (but within integrated optical networking module 100), so long the desired unified experience for managing the optical, electrical and protocol processing aspects is substantially maintained.

Optical and Optoelectronic Components

In one embodiment, optical/electrical components 102 and 104 include optical components for handling optical signals encoded with egress data and optical signals encoded with ingress data. In a "2 Km" embodiment, the optical components for handling optical signals encoded with egress data include lensed fiber, laser, substrate with attachment points to allow fiber to be attached and aligned with laser while the optical/electrical components 102 and 104 are active. In alternate "10 km" and "40 Km" embodiments, the optical components for handling optical signals encoded with egress data further include added optical isolator, external modulator, and lens system between laser and fiber. The optical components for handling optical signals encoded with ingress data include photodiode, beveled fiber, substrate with attachment points to allow active fiber alignment and attachment. In alternate embodiments, extensions to avalanche photodiode (APD) may also be provided.

Further, in one embodiment, optoelectronics include impedance-matching network to connect laser to laser driver and photodiode to transimpedance/limiting amplifier. In one embodiment, discrete circuitry is employed. Further, wire-bonds and substrate parasitics are employed to enhance the sensitivity of the circuitry.

In one embodiment, the support electronics further include serializer/deserializer, clock and data recovery, and clock grooming circuitry.

Protocol Processor

Figure 2:
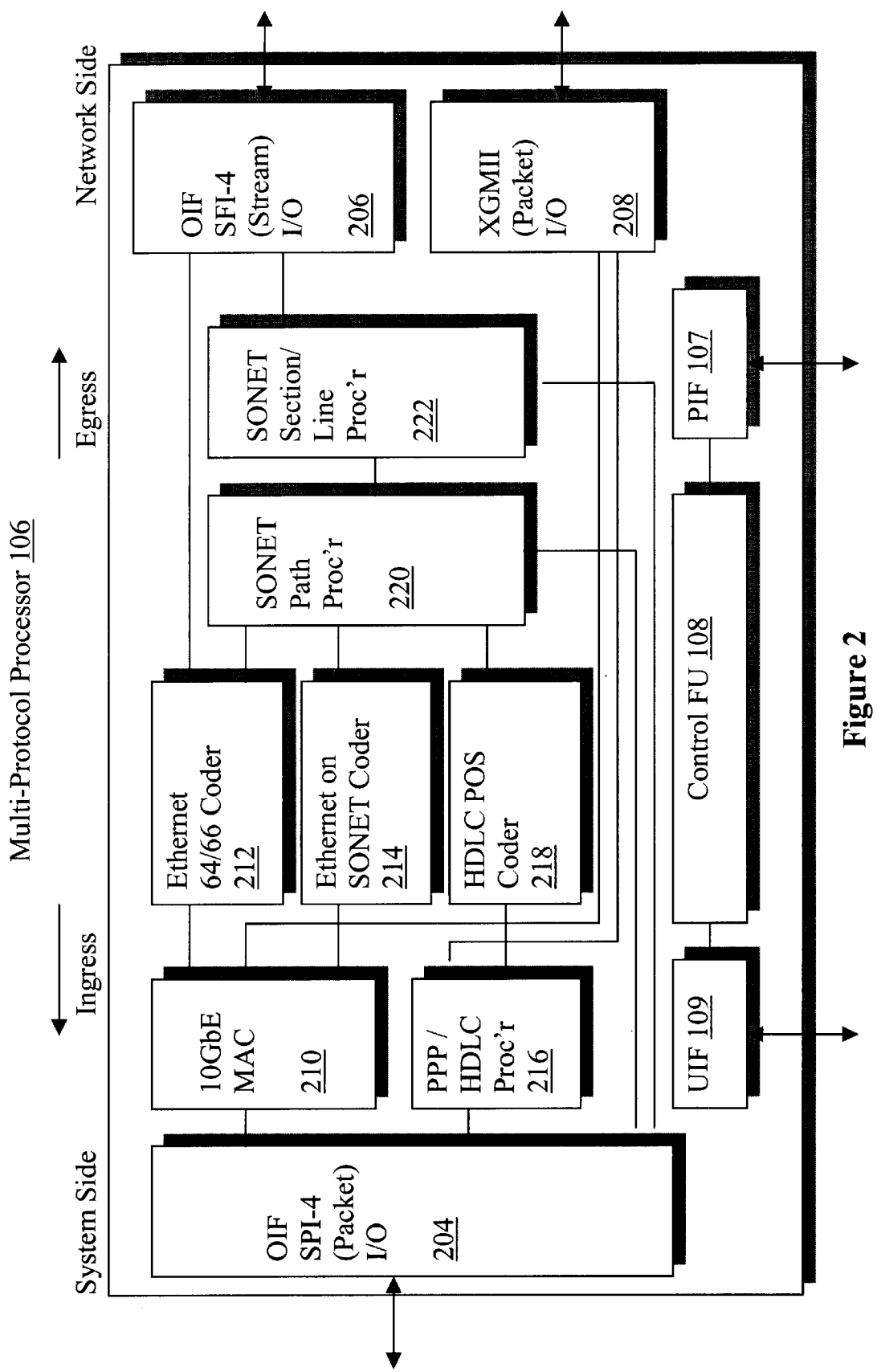
FIG. 2 illustrates the multi-protocol network processor of FIG. 1 in further details, in accordance with one embodiment.

Referring now to FIG. 2, wherein a block diagram illustrating protocol processor 106, in accordance with an ASIC embodiment, is shown. As illustrated, for the embodiment, in addition to control function unit and interfaces 107–109, protocol processor 106 includes system interface 204, network interface 206, intermediate interface 208, media access control block 210, Ethernet 64/64 coder 212, Ethernet on SONET coder 214, point-to-point protocol (PPP) and high level data link control (HDLC) processor 216, HDLC Packet over SONET coder 218, SONET path processor 220, and SONET section and line processor 222, coupled to each other as shown. Elements 204–222 are selectively employed in combination to service data transmission and receipt in accordance with a selected one of a number of frame based protocols, including frame based protocols encapsulated within a synchronous protocol, as well as streaming and packet variants of the synchronous protocol. In various embodiments, the protocols include at least one each a datacom and a telecom protocol, allowing the multi-protocol processor of the present invention to support data trafficking spanning local, regional as well as wide area networks. In other words, for the embodiment, protocol processor 106 is a single IC multi-protocol processor.

More specifically, for the illustrated embodiment, the elements are employed in combination to service data transmission and receipt as follows:

| Protocols | Elements Employed |
| --- | --- |
| SONET Stream | System Interface, SONET Section/Line Processor, Network Interface |
| SONET Packet | System Interface, SONET path processor, SONET Section/Line Processor, Network Interface |
| Packet over SONET | System Interface, HDLC processor, HDLC POS coder, SONET path processor, SONET Section/Line Processor, Network Interface |
| Ethernet on SONET | System Interface, 10GbE MAC, Ethernet on SONET coder, SONET path processor, SONET Section/Line Processor, Network Interface |
| 10GbE WAN | System Interface, 10GbE MAC, Ethernet 64/66 coder, SONET path processor, SONET Section/Line Processor, Network Interface |
| 10GbE LAN | System Interface, 10GbE MAC, Ethernet 64/66 coder, Network Interface |
| MAC Frame | System Interface, 10GbE MAC, Intermediate Interface |
| HDLC Frame | System Interface, HDLC Processor, Intermediate Interface |

As those skilled in the art would appreciate, the novel concurrent support of these protocols in a dynamically selectable manner, in particular, the inclusion of 10Gb Ethernet and Packet over SONET protocols, advantageously enables the processor of the present invention to scale local, regional, and wide area networks.

For the illustrated embodiment, the "operating" protocol is specified to control function unit 108, which in turn controls the above enumerated elements accordingly. In a preferred variant of the illustrated embodiment, control function unit 108 includes a control register (not shown) having a 3-bit "protocol" field. The 3 bit "protocol" field is accessible via 3 corresponding pins (not shown) of processor interface 107.

System interface 204 is provided to facilitate input of egress data and output of ingress data. In one embodiment, system interface 204 is a 16-bit parallel LVDS packet interface, compliant with OIF's SPI-4 interface defined for OIF-SPI4-02.0, which is a "phase 2" interface for the communication of packetized data between a physical layer and link layer entity. In one implementation, the 16-bit differential transmit and receive data busses operate at speed up to 832 Mb/s per bus line. By virtue of the ability of processor 100 to support the afore enumerated protocols, the transmit and receive data (i.e. the egress and ingress data) may be MAC, IP, PPP, HDLC or SONET framed/streaming data (including their in-band control words, where applicable). 10GbE MAC block 210 is provided to perform data link sub-layer media access control processing on egress and ingress MAC and IP data. For egress data, 10GbE MAC block 210 accepts correctly formatted frames (minus the preamble or start frame delimiter), and in response, adding the appropriate preamble/start frame delimiter, padding the frames to the maximum frame size, calculating and inserting the appropriate frame check sequences.

Ethernet 64/66 coder 212 and Ethernet on SONET Coder 214 are provided to perform physical sub-layer 64/66 and Ethernet on SONET coding and decoding for the egress and ingress MAC and IP data respectively.

PPP/HDLC processor 216 is provided to perform data link sub-layer point-to-point protocol and high level data link control processing on PPP and HDLC data. PPP/HDLC processor 216 is employed to frame or de-frame IP and POS data, providing appropriate encapsulation or de-encapsulation, in accordance to PPP and HDLC. Similarly, HDLC POS coder 218 is provided to perform physical sub-layer Packet on SONET coding and decoding for the egress and ingress HDLC data respectively.

SONET path processor 220 is provided to perform path processing for "packetized" SONET data, whereas SONET section and line processor 222 is provided to perform section and line processing for "packetized" as well as "streaming" SONET data.

Network interface 206 is provided to facilitate output of egress data and input of ingress data. In one embodiment, correspondingly, Network interface 206 is a 16-bit LVDS interface compliant with OIF's SFI-4 interface. In one embodiment, it operates at 622 MHz (645 for Ethernet 64/66 encoded data). Similar to system interface 204, by virtue of the ability of processor 100 to support the various protocols, the egress and ingress data may be physically coded MAC, IP, PPP, HDLC or SONET framed/streaming data (including their in-band control words, where applicable). The coded data may be a SONET data stream encapsulating the higher-layer protocols or a 64/66 coded Ethernet stream.

Intermediate interface 208 on the other hand is provided to facilitate output of MAC or HDLC egress data and input of MAC or HDLC ingress data. In one embodiment, parallel interface 208 is a 32-bit SSTL-2 interface. In one embodiment, parallel interface 208 operates at 312.5 MHz.

Multi-protocol processor 106 is the subject matter of co-pending application entitled "A Multi-Protocol Processor With Data Traffic Support Spanning Local, Regional and Wide Area Networks", having at least partial common inventorship and filed contemporaneously with the present invention. The co-pending application is hereby fully incorporated by reference.

Module Integration

As described earlier, optical components 102, optical-electrical components 104, support control electronics 105 and multi-protocol processor 106 are encased in a body (not shown) to form integrated optical networking module 100. In one embodiment, the encasing body and support control electronics 105 around the protocol processing electronics provide additional features to optical network module 100 otherwise would not be possible without the tight module-level integration of the present invention. In various embodiments, the supporting control electronics and the corresponding functionalities include

- Integrated temperature sensors to provide integrated thermal management for integrated optical networking module 100
- Sequencing electronic to regulate power supply provided to integrated optical networking module 100
- Electromagnetic Interference (EMI) shielding provided by the encasing body to facilitate compliance with relevant Federal Communication Commission (FCC) EMI standards
- Analog-to-Digital (A/D) and Digital-to-Analog (D/A) converters to facilitate the earlier described unified management of the various analog and optical components by complementary software, through multi-protocol processor ASIC 206 (more specifically, its processor and utility interfaces 107 and 109)

Optical Networking Equipment

Referring now to FIG. 3, wherein a block diagram illustrating an optical networking equipment 300 incorporated with integrated optical networking module 100 and its complementary control functions 120 of the present invention, is shown. As illustrated, optical networking equipment 300 includes in particular embedded processor 302. Disposed within processor 302 (more specifically, certain storage medium, such as non-volatile memory) are networking software 310 for the particular application of optical networking equipment 300 and complementary control functions 120 of the present invention. Processor 302 also includes execution units (not shown) for executing networking software 310 and control functions 120. Network software 310 implements the application level logic and some of the "higher level" data link sub-layer logic of optical networking equipment 300. Control functions 120 facilitate usage of optical networking module 100 by networking software 310 to handle the remaining "lower level" data link sub-layer and physical sub-layer responsibilities. As illustrated, for the embodiment, control functions 120 include static network functions 130 and dynamic network functions 140.

Networking software 310 may implement any one of a number of networking applications. With the advantageous incorporation of optical networking module 100 of the present invention, which includes flexible support for a plethora of protocols, optical networking equipment 100 may be networking equipment for any one of a number of optical networking markets spanning local, regional and wide area networks, including but are not limited to, routers or switches for DWDM intraconnect, WAN uplinks and 10GbE.

Before proceeding to further describe static network functions 130 and dynamic network functions 140, it should be noted that the low level device code that actually handles the physical interactions between processor 302 and multi-protocol processor 106 may be consolidated into a common set of "device driver" routines (not shown) to be shared among static network functions 130 and dynamic network functions 140.

Static and Dynamic Network Functions

Referring now to FIG. 4, wherein a block diagram illustrating static network functions 130 and dynamic network functions 140 in further detail is shown. As illustrated, for the embodiment, static network functions 130 include at least initialization and termination function 412, protocol flow selection function 414, configuration function 416, and module management function 418, whereas dynamic network functions 140 include physical layer functions 422, interrupt monitoring and interrupt handling functions 424 and monitoring functions 426.

For the embodiment, initialization and termination function 412 is employed to create and initialize a working structure for use by other functions (at "start up") and to tear down the working structure (at "termination"). The practice of the present invention does not depend on the employment of any particular data structure organization. Any one of a number of data organization techniques known in the art may be used.

Protocol flow selection function 414 is employed to specify for optical networking module 100, more specifically, for multi-protocol processor 106 (by way of control function unit 108), the "operating" protocol flow. The protocol flow for the embodiment, as alluded to earlier, may be SONET stream, SONET packet, Packet over SONET (POS), 10Gbase-LR, 10Gbase-LW and so forth. As described earlier, in response, the appropriate interfaces and processing units of multi-protocol processor 106 will be selectively employed in combination to handle the egress and ingress data transmitted in accordance with the specified protocol.

Configuration selection function 416 is employed to configure optical networking module 100. In a preferred embodiment, a number of pre-defined configuration files specifying the configuration of optical networking module 100 for various operational frameworks, i.e. SONET stream, SONET frame etc., are also provided. Preferably, the configurable actions/parameters include setting/resetting buffer sizes, setting/resetting various operation parameters of the various protocols including getting their current settings. Configuration selection function 416 is employed to specify which one of these pre-provided configuration specifications is to be employed. In one embodiment, an editing function (not shown) is also employed to facilitate editing and modification of the pre-provided configuration specifications.

Module management function 416 is employed to monitor the operation of optical network module 100. Preferably, the management actions and data supported include retrieving an identifier of the optical networking module 100, a version identifier of control functions 120, and so forth.

Physical layer functions 422 are employed to control, monitor and manage various physical layer aspects of the protocols supported. Preferably, the actions/parameters supported include turning a laser of the optical components 102 on and off, resetting optical networking module 100, retrieving the status of the current transmit and receive optical power, transmit laser bias current, transmit laser modulation current, transmit laser temperature, loss of transmitter lock, loss of receiver lock, and so forth.

Interrupt monitoring and interrupt handling function 424 is employed to program a number of events, counters, alarms and error conditions, and optionally specify handling routines for the various interrupt events, counters, alarms and error conditions specified.

Finally, monitoring function 426 is employed to start monitoring of a number of aspects of the supported protocols, including retrieving and reporting on the current values of selected ones of the monitoring metrics. Preferably, the monitoring actions and metrics supported include start monitoring on the various operational metrics of the various protocols, the interfaces and the processing units. For examples, for SONET flows, the monitoring actions and metrics may include various operational metrics of the section, line and path conditions and alarms, including B1, B2 and B3 errors, APS, AIF, REI, RDI, SEF, SIF, SOP, LOP and LOS and others (see SONET specification for the precise meaning of these mnemonics. For Packet over SONET flows, the monitoring actions and metrics may include monitoring and reporting of RMON packet size and error statistics derived from Ethernet, as well as PPP/HDLC protocol-specific features such as detected address, control, and protocol fields. For 10Gbase-LR and 10Gbase-LW, the monitoring actions and metrics may include mapping of the various relevant RMON parameters specified by the standard, such as counters for multicast packets retrieved, broadcast packets received, frames transmitted OK, frames received OK, fame length errors, FCS errors, packet length histogram, packets sent/received, packet bytes sent/received, and so forth.

Control functions 120 may be implemented in any one of a number of programming languages known in the art, such as C or assembler. For flexibility and ease of system integration the preferred embodiment uses C. Their implementations in accordance with the above description are well within the ability of those ordinarily skilled in the art of designing and developing optical network equipment. While for ease of understanding, the description of the complementary control functions 120 has been limited to the above described exemplary control actions and parameters, as those skilled in the art will appreciate that the present invention may be practiced with more supported function actions and parameters. Likewise, if desired, the present invention may also be practiced with less supported actions and parameters.

Conclusion and Epilogue

Thus, it can be seen from the above descriptions, a novel integrated optical networking module singularly capable of handling optical to electrical and electrical to optical conversion, as well as selective performance of data link and physical sublayer processing in accordance with a selected one of a plurality of protocols spanning local, regional and wide area networks, as well as having unified software control to manage the module has been described. While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. An optical networking module comprising:
   an optical component to send and receive optical signals encoded with data transmitted in accordance with at least one protocol;
   an optical-electrical component coupled to the optical component to encode digital data onto optical signals and to decode encoded digital data on optical signals back into their digital forms;
   supporting control electronics coupled to said optical and optical-electrical components to manage said optical and optical-electrical components;
   a protocol processor ASIC coupled to the optical-electrical component, the optical component and the supporting control electronics to perform data link and physical sub-layer processing on egress as well as ingress ones of said data in accordance with a selected one of said at least one protocol, said protocol processor ASIC including interfaces in support of external software control functions for managing said protocol processor ASIC and at least partially one of said optical and optical-electrical components through said interfaces and said supporting control electronics;
   an additional digital interface disposed outside said protocol processor ASIC, and coupled to said support control electronics, to support said external software control functions in managing at least partially one of said optical and optical-electrical components; and
   a body encasing said optical component, said optical-electrical component, and said protocol processor ASIC as a single module.

2. An optical networking module comprising:
   an optical component to send and receive optical signals encoded with data transmitted in accordance with at least one protocol;
   an optical-electrical component coupled to the optical component to encode digital data onto optical signals and to decode encoded digital data on optical signals back into their digital forms;
   supporting control electronics coupled to said optical and optical-electrical components to manage said optical and optical-electrical components;
   a protocol processor ASIC coupled to the optical-electrical component, the optical component and the supporting control electronics to perform data link and physical sub-layer processing on egress as well as ingress ones of said data in accordance with a selected one of said at least one protocol, said protocol processor ASIC including interfaces in support of external software control functions for managing said protocol processor;

a digital interface disposed outside said protocol processor ASIC, and coupled to said support control electronics, for supporting said external software control functions in managing at least partially one of said optical and optical-electrical components; and a body encasing said optical component, said optical-electrical component, and said protocol processor ASIC as a single module.

3. An optical networking module product set comprising:

an integrated module having an optical component to send and receive optical signals encoded with data transmitted in accordance with a selected one of a plurality of protocols, an optical-electrical component coupled to the optical component to encode digital data onto optical signals and to decode encoded digital data on optical signals back into their digital forms, supporting control electronics coupled to said optical and optical-electrical components to manage said optical and optical-electrical components, a protocol processor ASIC coupled to the optical-electrical component, the optical component and the supporting control electronics to perform data link and physical sub-layer processing on egress as well as ingress ones of said data in accordance with said selected one of said plurality of protocols, said protocol processor ASIC including interfaces in support of external software control functions for managing said protocol processor ASIC and at least partially one of said optical and optical-electrical components through said interfaces and said supporting control electronics;

an additional digital interface disposed outside said protocol processor ASIC, and coupled to said support control electronics, to support said external software control functions in managing at least partially one of said optical and optical-electrical components, a body encasing said optical component, said optical-electrical component, and said protocol processor ASIC as a single module; and said external software control functions to be employed to program a host processor of the integrated module to manage said protocol processor ASIC, and said optical and optical-electrical components through said protocol processor ASIC and said supporting control electronics.

4. An optical networking module product set comprising:

an integrated module having an optical component to send and receive optical signals encoded with data transmitted in accordance with a selected one of a plurality of protocols, an optical-electrical component coupled to the optical component to encode digital data onto optical signals and to decode encoded digital data on optical signals back into their digital forms, supporting control electronics coupled to said optical and optical-electrical components to manage said optical and optical-electrical components, a protocol processor ASIC coupled to the optical-electrical component, the optical component and the supporting control electronics to perform data link and physical sub-layer processing on egress as well as ingress ones of said data in accordance with said selected one of said plurality of protocols, said protocol processor ASIC including interfaces in support of external software control functions for managing said protocol processor ASIC;

a digital interface disposed outside said protocol processor ASIC, and coupled to said support control electronics, for supporting said external software control functions in managing at least partially one of said optical and optical-electrical components, a body encasing said optical component, said optical-electrical component, and said protocol processor ASIC as a single module; and said external software control functions to be employed to program a host processor of the integrated module to manage said protocol processor ASIC, and said optical and optical-electrical components through said protocol processor ASIC and said supporting control electronics.

\* \* \* \* \*

UNITED STATES PATENT AND TRADEMARK OFFICE
CERTIFICATE OF CORRECTION

PATENT NO. : 6,567,413 B1
DATED : May 5, 2003
INVENTOR(S) : Denton et al.

Page 1 of 1

It is certified that error appears in the above-identified patent and that said Letters Patent is hereby corrected as shown below:

Column 4,
Line 1, "...10 Gbase-LR..." should read -- ...10Gbase-LR... --.
Line 1, "...10 Gbase-LW..." should read -- ...10Gbase-LW... --.

Column 11,
Line 17, "...digital forms, supporting..." should read -- ...digital forms, supporting... --.

Signed and Sealed this

Fourth Day of January, 2005

JON W. DUDAS
*Director of the United States Patent and Trademark Office*